INVENTORS
JAMES N. MORRELL &
RONALD G. HUNE
BY Hooper Leonard & Buell
Their Attorneys

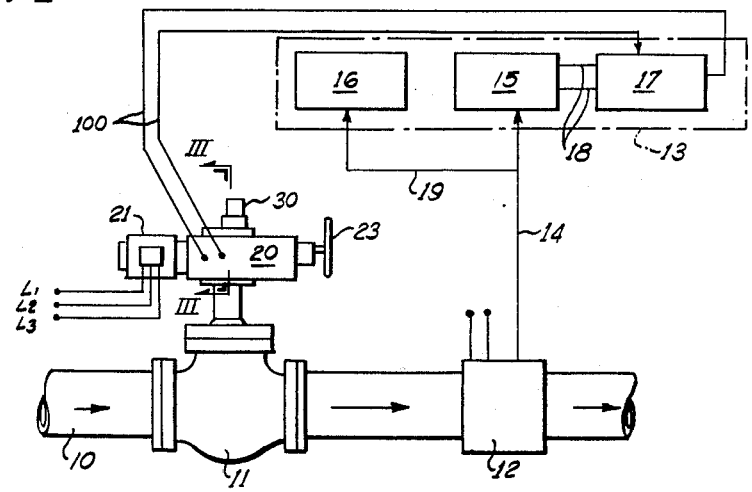
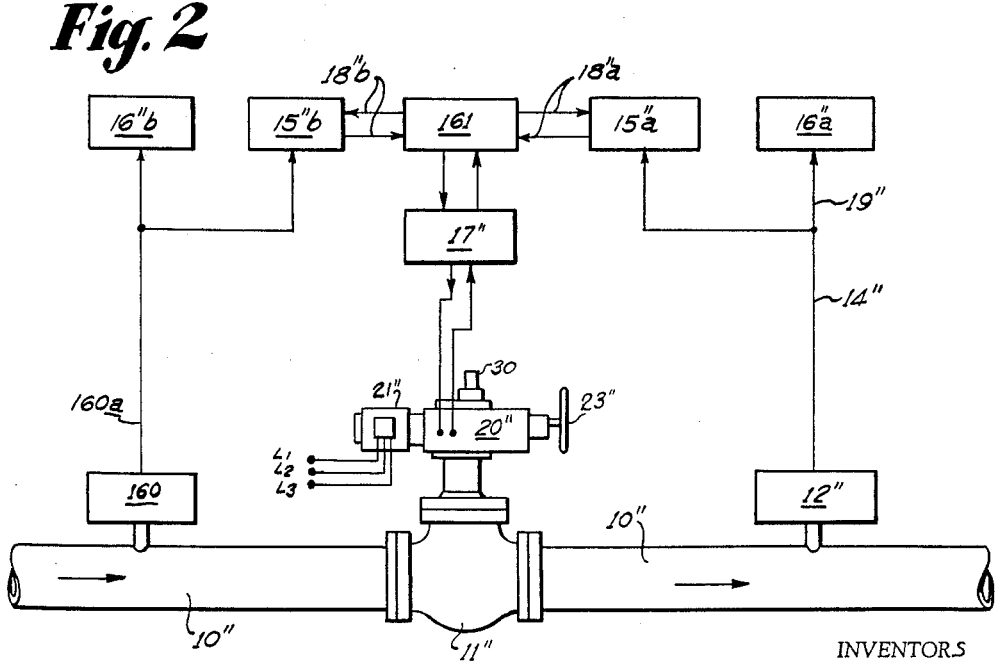

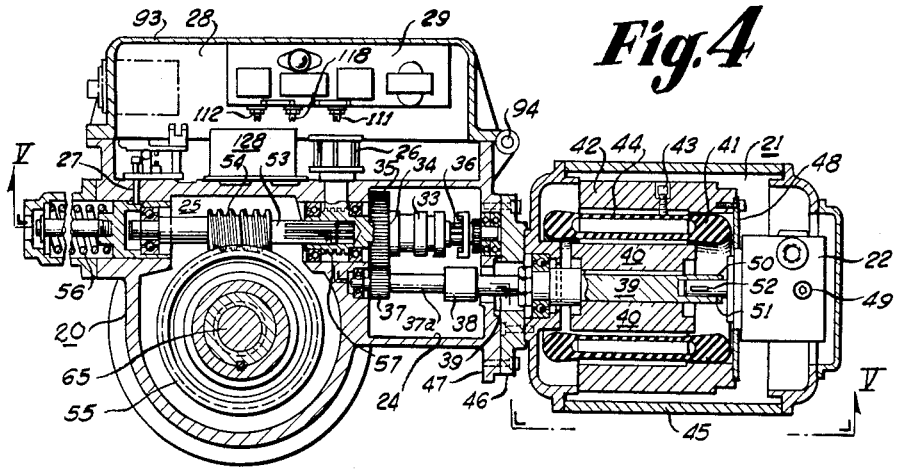
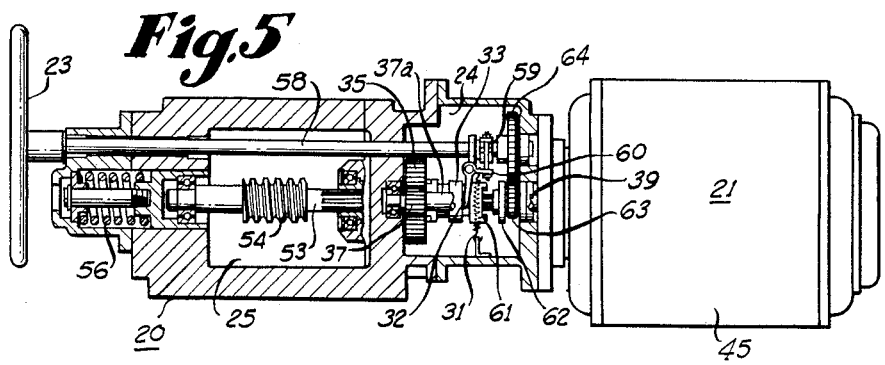
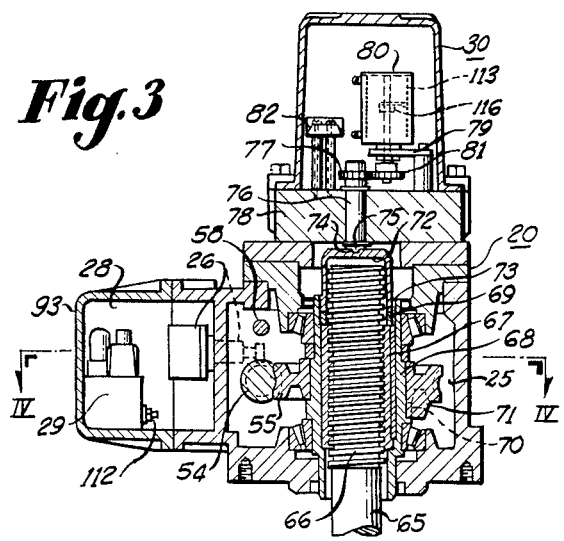
INVENTORS
JAMES N. MORRELL &
RONALD G. HUNE

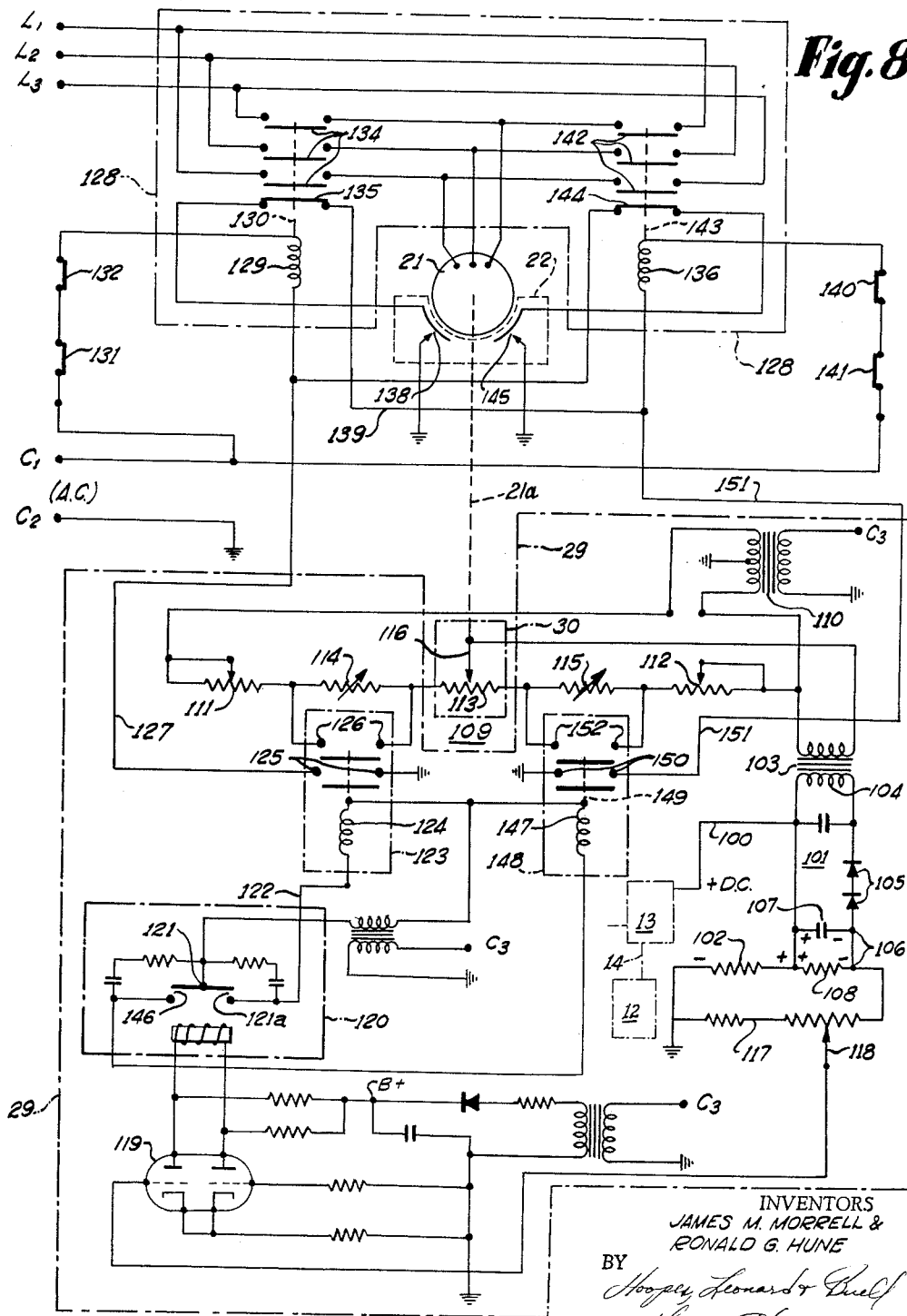

United States Patent Office 2,961,586
Patented Nov. 22, 1960

2,961,586

ANTICIPATORY CONDITION CONTROL SERVOSYSTEM

James N. Morrell, Piney Point, and Ronald G. Hune, Houston, Tex.; said Hune assignor to E-I-M Company, Incorporated, Houston, Tex., a corporation of Texas Filed Dec. 23, 1957, Ser. No. 704,444

10 Claims. (Cl. 318—28)

This invention relates to an electronic valve control system useful, for example, in the automatic or manual controlling of valves along a pipe line, or at a pumping or compressor station, or in a tank farm, or at industrial plants. More particularly, our invention pertains to such system which is virtually entirely electrical and immediately obtains desired regulation without underrunning or overrunning the satisfaction position of the controlled device.

In devices made in accordance with this invention, disadvantages of prior systems stemming from the pneumatic, hydraulic, electro-pneumatic or electro-hydraulic character thereof, including needs for auxiliary equipment like compressors, converters, dryers, filters and other items, have been eliminated with a marked reduction in expense and likelihood of trouble such as possible freezing of pneumatic connections in winter weather in more severe climates. In addition, our new system has practically instantaneous response and a sensitivity such that undertravel or overtravel of the regulated device is avoided because the new system anticipates mechanical and non-mechanical lag in the system to provide precise control. Further, the new system may be made responsive to a single stimulus or to a plurality of stimuli of which the most important would be selected for responsive actuation by our new control. The new system utilizes a null balance of negative and positive potentials for control of the new construction, with zero speed plugging of a motor element for stoppage at the precise position at which the selected signaling stimulus will be satisfied. An insensitive band at the balance point is preferably incorporated to inhibit hunting and avoid actuation of the system in cases of insignificant imbalances.

Other and further advantages, features and objects of our invention will be apparent from the following description and the accompanying drawings, which are illustrative only, in which:

Figure 1 is a block diagram including a single stimulus embodiment of this invention constructed in the form of an electronic valve control;

Figure 2 is a block diagram including a plural stimulus embodiment of our invention constructed in the form of an electronic valve control;

Figure 3 is a partial view in elevation section taken along line III—III of Figure 1;

Figure 4 is a partial view in plan section taken along line IV—IV of Figure 3;

Figure 5 is a partial view of the embodiment illustrated in Figures 3 and 4 taken along line V—V of Figure 4;

Figure 8 is a preferred circuit diagram for the electronic valve control system embodiments illustrated in the foregoing figures.

Figure 6:
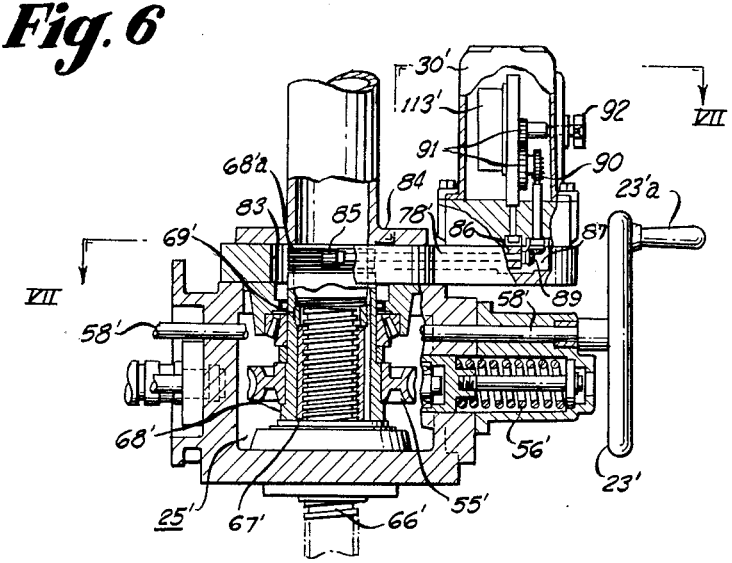
Figure 6 is a partial view in elevation with portions removed showing a modified form of an electronic valve control embodiment of this invention.

In the illustrative single stimulus electronic valve control system construction of Figure 1, a fluid pipe line 10 is provided with a valve 11 therein and a conventional transducer 12 on the discharge side of valve 11 to change discharge pressure into an electrical signal or stimulus which will actuate the new system when it achieves a predetermined magnitude. Transducer 12 is electrically connected to a conventional controller 13 by a connection 14. Controller 13 is panel mounted and may include an automatic controller 15, an indicator 16 which may also be a recorder and, if desired, a manual controller 17 capable of removing the automatic controller 15 from service when set to do so. A connection 18 extends between the two controller portions 15 and 17 and indicator 16 is connected electrically by line 19 to the stimulus signal line 14. A connection 100 conducts a positive direct current output signal from the controller whenever there is a stimulus signal to an electronic valve control 20 of this invention.

As illustrated, valve control 20 comprises a motor mechanism 21, a conventional plugging switch 22 for said motor, a handwheel 23 and its mechanism, a clutch mechanism 24, a valve stem gear operator mechanism 25, and geared limit and torque switch means 26 and 27 associated therewith. In addition, valve control 20 is provided with cooperating circuit elements in a switch compartment 28 with a motor director 29 therein and in a potentiometer casing 30 mounted on top of the valve control structure. The working of mechanism shown in clutch compartment 24 and in gear compartment 25 is fully described in an application for United States Letters Patent, Serial No. 513,763, filed June 7, 1955, by James N. Morrell, one of the applicants herein.

In the clutch mechanism in compartment 24, a spring 31 acts to swing a fork 32 to maintain a double-ended slidable clutch member 33 in motor drive connection with a coacting clutch jaw 34 on a motor driven gear 35 mounted in loose relation on a splined clutch shaft 36 to which the clutch jaw 33 is connected in slidable, keyed relation. Gear 35 is driven by a motor pinion 37 through a stub shaft 37a and a flexible coupling 38, by a motor armature shaft 39 in a reversible electric motor 21 which preferably is wholly enclosed so as to be explosion-proof when utilized for example in connection with oil and gas field work, or certain industries. As shown, motor 21 is a three-phase motor with an induction rotor 40 keyed to armature shaft 39 and responsive to the field provided by coil windings 41. Field coils 41 are held in a stator sleeve 42 in part by spacing screws 43 which provide ventilation spaces 44 within the motor casing 45 enclosing the motor. Casing 45 has a flange 46 which is bolted to a mating flange 47 on one side of compartment 24. Casing 45 is made large enough to enclose a two-directional plugging switch 22 therein fastened to stator sleeve 42 by a mounting flange 48. The stator sleeve 42 in turn is affixed in a suitable manner to casing 45.

The plugging switch response may be adjusted by the respective right and left hand adjustment screws 49 incorporated therein to regulate the amount of motor torque required to close the respective plugging contact corresponding to the direction of rotation of armature shaft 39. Armature shaft 39 is provided with a counterbore 50 into which a shaft 51 of zero speed plugging switch 22 extends, shafts 51 and 39 being keyed together by a key 52.

When clutch shaft 36 is rotated by member 33, it rotates a worm shaft 53 keyed thereto in splined relation and a worm 54 on shaft 53 rotates a worm wheel 55. Endwise movement of worm shaft 53 is under the control of a torque spring 56 and torque switch 27 for two-directional torque limit force control in the illustrated embodiment. Further, rotation of shaft 53 rotates a helix thread 57 fixed thereto to move the respective geared limit switches 26 for actuation at the preselected respective extremities of movement of the stem in valve 11.

If there is to be a manual operation of the clutch mechanism in compartment 24, handwheel 23 may be turned to rotate a shaft 58 and through a two-directional friction collar 59 raise an arm 60 integral with fork 32 against the pull of spring 31 to slide clutch member 33 to the right as viewed in Figure 5 causing the engagement of jaws 61 and 62. Jaws 62 are connected to a manual driven gear 63 turned by a manual pinion 64 fixed on shaft 58 and as a consequence the rotation of worm 54 will be in accordance with the direction and extent of turning of handwheel 23. Such capacity of a handwheel operator to take over the operation of the clutch mechanism from motor connection and put it into manual connection is termed "manual preference." When the handwheel 23 is released, spring 31 will return the device to motor connection as illustrated in Figures 4 and 5. Moreover, although the system of this invention is described herein as embodying a manual preference non-coincidental valve control, it may embody other types of valve controls and, indeed, may be used in other fields such as, by way of example only, the field of furnace duct dampers.

Valve 11 is provided with a non-rotating so-called rising stem 65, the upper end of which is rigidly connected to a threaded stem extension 66 which may be integral with stem 65. Extension 66 is in threaded engagement with an internally threaded liner 67 keyed to a bushing stem nut 68, the liner being locked in vertical position by a locknut 69 in the manner set forth in United States Patent No. 2,724,978. Nut 68 in turn acts as a hub for worm wheel 55, the nut having lugs 70 to key a projection 71 on worm wheel 55 so that rotation of the worm wheel will rotate the nut 68 and its liner 67 thereby causing extension 66 to rise and fall and correspondingly and respectively opening and closing valve 11. As shown in Figure 3, stem 66 is in its uppermost position.

A connector 72 is also provided and threaded into the upper part of nut 68 as shown. A keyway 73 is provided through the threads of nut 68 to enable the liner key to slide past them when the locknut 69 and hood 72 are removed. A slotted recess 74 is provided in the top of connector 72 to receive a fitted projection 75 on the lower end of a stub shaft 76, the upper end of which is keyed to a drive gear 77 in feedback potentiometer casing 30. A base plate 78 is respectively connected to the cover of gear compartment 25 and to casing 30 to hold the feedback potentiometer in place. A bracket 79 is fixed to plate 78 and for such a potentiometer in the form of a Helipot 80 having a resistor 113 therein and a movable arm 116 in contact therewith. A driven gear 81 engages gear 77 to move arm 116 in accordance with the rotation of nut 68. Terminals 82 lead from the feed-back potentiometer in casing 30 to appropriate circuit portions of valve control 20.

A suitable circuit for electronic valve control 20 is illustrated in Figure 8 and will be traced. Let it be assumed that the transducer 12 shown in Figure 1 signals controller 13 that a change in the setting of valve 11 is required which necessitates movement thereof in an opening direction and that the controller will respond by generating a positive direct current voltage of a magnitude proportional to the stimulus. The controller signal will pass through conductor 100 and be impressed across a resistor 102 in a comparator subcircuit 101 in director 29. A transformer 103 impresses an alternating current voltage across the secondary 104 thereof, which alternating current in the secondary is rectified by rectifiers 105 to provide a corresponding direct current potential across a parallel combination 106 of a capacitor 107 and resistor 108. The polarity of the voltage across resistor 108 is always opposite to that across resistor 102.

The magnitude of the direct current voltage impressed across combination 106 in subcircuit 101 is proportional to the alternating current voltage impressed across the primary winding of transformer 103, which primary winding is in a subcircuit 109 which includes the feedback potentiometer 113 in casing 30. Subcircuit 109 is powered by means of a transformer 110, the primary of which, one terminal thereof being indicated as $C_3$, is held at constant voltage by a constant voltage transformer. Subcircuit 109 is provided with two adjustable rheostats respectively numbered 111 and 112 which are used to make the limits of movements of the feed-back potentiometer arm 116 along potentiometer wire 113 correspond to the selected limits of travel of the controlled valve. Further, that subcircuit is provided with two variable anticipation resistors 114 and 115, respectively. Arm 116 moves in correspondence with the movements of valve control motor 21 through nut 68, connector 72 and the gears 77 and 81. Arm 116 is connected to one side of the primary winding of transformer 103 to complete the output circuit from subcircuit 109.

The output signal from subcircuit 109 varies in accordance with the relative position of arm 116 along potentiometer wire 113. The differential potential between the two D.C. voltage signals being compared in subcircuit 101 is impressed across a sensitivity potentiometer 117. An arm 118, which is adjusted to a predetermined setting, conducts the desired proportional amount of the differential direct current signal to one grid of a twin triode 119. The setting of arm 118 along potentiometer 117 provides a selected "dead band" to each side of the null electrical balance point in the circuits of director 29 inclusive of the feed-back potentiometer circuit and renders the system insensitive to potential differentials in either voltage direction when they are below a selected minimal magnitude.

Assuming that the compared difference sent through arm 118 is positive in direction, heretofore assumed as indicating a valve opening need, relatively more current will flow for the illustrated circuit through the left-hand side of triode 119 and a relatively lesser current will flow through the right-hand side thereof as viewed in Figure 8. In turn, a polarized relay 120 will be actuated in a corresponding direction by the movement of its armature about a pivot 121 to close switch 121a connected by a conductor 122 to an auxiliary relay 123. A solenoid coil 124 in relay 123 will thereupon become energized, closing the normally open sets of contacts 125 and 126. The circuit thereby made through switch 125 will pass through a conductor 127 to one side of a motor contactor 128 and energize a solenoid coil 129 to actuate a gang contact 130, which is normally in the position shown due to spring or gravity bias. That side of contactor 128 is provided with a normally closed switch 131 in the geared limit switch mechanism 26 and with a torque switch 132 in the torque mechanism 27, which must remain closed if the valve 11 is to be moved in an opening direction. The contactor 128 receives its power supply through terminals $C_1$ and $C_2$ from a normal single phase alternating current source.

The closing of contacts 134 connects the three-phase alternating current powerlines $L_1$, $L_2$ and $L_3$ to the corresponding terminals of the polyphase reversible motor 21 and cause it to turn in a corresponding valve opening direction. At the same time, an interlock contact 135 is opened to prevent the energization of the opposite contactor coil 136 due to current which might otherwise pass over through a plugging switch 22 which has had its normally open switch 138 on one side closed due to such motor rotation. Such rotation of motor 21 through its mechanical connection 21a with arm 116 moves that arm in a satisfaction direction along the winding 113 of the feedback potentiometer as the valve opens in the course of moving to its new desired position. In so moving, for the assumed condition being controlled, the signal impressed upon conductor 100 will decrease and the comparative signal across the combination 106 in subcircuit 101 will increase toward an electrical balance (null) point between the two direct current signals being continuously compared in subcircuit 101.

During the responsive movement of arm 116, normally open contact switch 126 has been closed, shorting out the anticipatory resistor 114. If the control signal, which is a positive direct current voltage, is decreasing, the respective anticipatory resistor 114 reduces the compared negative output voltage so that an apparent electrical null will be obtained before the true null position is reached in the valve. Such shunting therefore has the effect of providing a predetermined somewhat earlier electrical satisfaction due to movement of arm 116 with an apparent balance between the two signals being compared in subcircuit 101 earlier than would otherwise be the case. In this way, overshooting of the actual balance desired in the mechanical portion of the system, which balance corresponds to the desired changed rest position of the valve, is prevented because the value of resistor 114 will be selected to anticipate and thereby compensate timewise for the mechanical and electrical inertia and delay in the system. The other anticipatory resistor 115 performs in a like manner when the control signal is increasing in the course of a valve change in a closing direction.

When the electrical null balance is reached, the current flow through the two sides of triode 119 becomes equal, de-energizing the polarized relay 120 and opening switch 121a therein, thereby de-energizing auxiliary relay 123 and causing the switches 125 and 126 to return to their normally open positions. Such opening of switch 125 de-energizes contactor coil 129, shutting off the current to motor 21 and restoring contact 135 to its normally closed position, whereupon current flows through conductor 139, the momentum of motor 21 serving for the time being to keep contacts 138 closed in plugging switch 22.

The current flowing through conductor 139 will energize the contactor coil 136 provided, of course, that the respective geared limit and torque switches 141 and 140 for the valve closing direction remain in their normally closed conditions. Such energization of contactor coil 136 will close contacts 142 on the gang contact 143 and energize the field of motor 21 in a reverse direction to provide rapid deceleration of its armature. Such closing of contacts 142 at the same time opens the normally closed interlock switch 144 which prevents energizing of coil 129, thereby preventing the application of power to the motor through contacts 134. When the speed of the armature of motor 21 has decreased to a predetermined low level near the zero speed point, the plugging switch 22 will cause its contacts 138 to return to normally open condition, thereby plugging motor 21 to a precise stop at zero speed and de-energizing contactor coil 136, whereupon the gang contacts 142 will return to biased open position illustrated in Figure 8. Even though contact 144 recloses upon such return, no energization of motor 21 will occur because the other plugging switch set of contacts 145 remains in its normally open position.

If it now be assumed that the transducer 12 stimulus calls for a movement of the valve 11 in a closing direction, the controller 13 will send a positive signal through conductor 100 which we now will assume is of a magnitude less than the "bucking" direct current voltage impressed across the combination 106. That controller input signal will be reflected in the potential across resistor 102 and compared with the signal across resistor 108 resulting, this time, in subjecting the circuit shown in Figure 8 to an imbalance potential differential in the other direction through connection 118. The result will be that the right-hand side of triode 119 will pass more current, resulting in turn in an opposite effect in relay 120 causing contact switch 146 to close. The closing of switch 146 will energize coil 147 of relay 148 and close the normally open gang contact 149. The closing of switch 150 caused thereby will allow current to pass through conductor 151 to energize motor contactor coil 136, closing the gang connected contacts 142 and opening interlock switch 144. The closing of the contacts 142 will turn motor 21 in a valve closing direction provided that the torque 140 and limit switch 141 are closed. As the motor so turns, it will mechanically operate the valve 11, moving it in a closing direction toward the new desired satisfaction position thereof. At the same time, the armature of motor 21 will rotate potentiometer arm 116 in the opposite direction, as viewed in Figure 8, decreasing the potential across combination 106 toward the new balance magnitude at the same time that the imbalance signal from the stimulus source is itself increasing toward electrical balance in response to the closing movement of the valve.

As in the case of the valve opening operation, a valve closing operation also utilizes a preset anticipation circuit which includes resistor 115, such resistor being shorted out by the closing of switch 152 so that an apparent electrical null balance is reached earlier than would otherwise be the case if resistor 115 were not so short-circuited, whereby as described above, "undershooting" and "overshooting" of the controlled element satisfaction position is avoided. When such a closing operation produces a balance in the comparator subcircuit 101, the switch 146 in relay 120 will open and de-energize the auxiliary closing relay 148, which in turn will initiate the plugging of motor 21 to a stop through the plugging contacts 145 which had been closed by the turning of motor 21 in a valve closing direction, in a reversal of the plugging sequence described above. Moreover, as in the case of resistor 114, the opening of contacts 152 restoring resistor 115 to subcircuit 109 does not cause sufficient upset in the comparator subcircuit 101 to actuate relay 120 or otherwise interfere with the operation and the motor 21 will stop dead at the precise control satisfaction position required, leaving the system satisfied and in both electrical and mechanical balance ready for a new stimulus signal of any magnitude in either direction within the capacity of the apparatus used.

Further, inasmuch as the illustrated clutch mechanism 24 of valve control embodiment 20 provides manual preference, if a person should turn the handwheel 23 and change the setting of valve 11, such movement would correspondingly move arm 116 and if that movement produced an imbalance in the circuit beyond the "dead band" because of a contrary controller setting, the electronic valve control would respond to the imbalance as described above and return the valve to the null rest position which it had before the handwheel was operated in accordance with that controller setting. The "dead band" on each side of the precise electrical balance point is controlled by sensitivity control 117 and is made as small as practicable within the limits of needed accuracy and the inhibition of "hunting."

In the case of the electronic circuit described above, for example, provision may be made instead for a valve opening movement upon receipt of a positive direct current voltage signal from the controller which has a lesser magnitude than the magnitude of the negative voltage impressed across resistor 108.

Thus, it will be seen that our new electronic valve control system will instantly move valve 11 to its desired new position to satisfy the controller signal irrespective of whether or not that signal has a magnitude which is greater or less than the potential impressed by the subcircuit 109 upon the comparator subcircuit 101. By virtue of the ability of the new system to anticipate inertia and lags in the electrical and mechanical components, such as time required for relay, contactor and mechanical actions to take place, the elimination of undertravel and overtravel of the controlled device, whether a valve or other equipment, has been eliminated. The electronic circuit shown in Figure 8 is illustrative only and may be arranged in a variety of ways within the purview of this invention and applied to various types of equipment.

Figure 7:
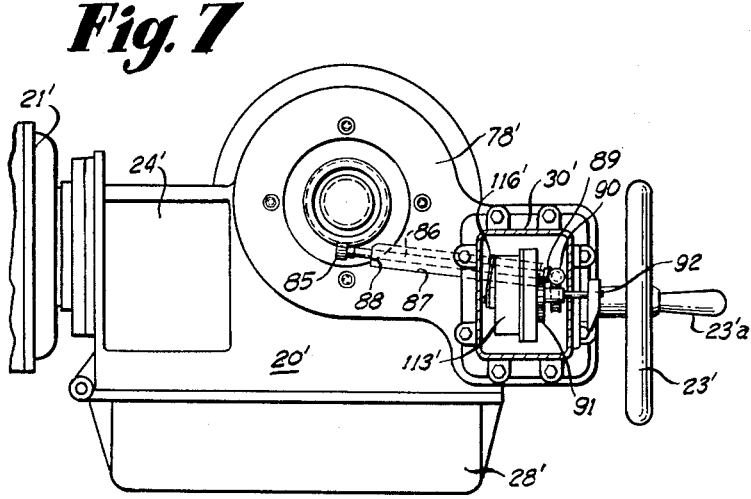
Figure 7 is a view in plan of the modification shown in Figure 6 taken along line VII—VII thereof.

A modified valve control embodiment is illustrated in Figures 6 and 7 wherein parts corresponding generally in construction and functioning are provided with the same reference numerals with the addition of a prime accent thereto. Thus, in such modification, a base plate 78' is offset toward handwheel 23' and provided with a central opening 83 therethrough in registry with the axis of threaded valve stem 66'. A protector hood 84 is fastened to plate 78' and serves as a cover for the opening through the top of the gear compartment. The hood 84 is closed at the top at a level above the maximum height reachable by the top of stem 66'. In this way, a gate valve may be controlled by such a practice of this invention having a full-rising threaded stem 66' with a relatively long travel between the extreme top and bottom positions thereof, stem 66' being shown, in Figure 6, in a closed valve position. The bushing stem nut 68' is externally spirally threaded at its upper end 68'a to mesh with a Boston-type spur gear 85. Gear 85 is connected to a shaft 86 mounted in and passing through a recess 87 in plate 78'. Recess 87 is closed by a cover 88. The other end of shaft 86 is provided with a beveled gear set 89 which rotates a worm 90 and in turn operates a pair of spur gears 91 to rotate arm 116' on a slide wire potentiometer resistor 113' in accordance with movements of nut 68' and thereby of movements of the valve of which stem 66' is a part. A dial indicator 92 on the exterior of casing 30' is fastened to the shaft on which arm 116' is connected and directly indicates the position of the valve controlled by the modification illustrated in Figures 6 and 7. In view of the relatively great reduction obtainable by virtue of the gear ratios in the train between threaded stem 66' and arm 116', it is clear that such modification will work with valve stems of extreme length and of very large size irrespective of the number of threads on such stems. Further, such gear ratios may be varied by changing respective ones of the gears, as will be understood, to provide whatever gear reduction is desired. In general, in a potentiometer of the kind illustrated in Figures 6 and 7, the arm 116' never swings through an angle as great as a complete 360° circle. The circuitry hereinabove illustrated in Figure 8 will coact with the modification illustrated in Figures 6 and 7 in the course of a practice of our new system.

The switch compartments of the foregoing embodiments preferably have a removable cover, such as cover 93 to compartment 28 which is hinged at 94 to the housing of valve control 20. When cover 93 is opened, the motor director 29 is accessible for servicing or for adjustment, as desired. Further, if desired, circuit equipment such as the motor director 29 may be separately cased and mounted at a distance from the remainder of the equipment. A somewhat different hookup may be employed as illustrated in the block diagram of Figure 2 when two or more origin signals or stimuli are to be converted into electrical signals to be fed into our new system for response and satisfaction.

In the schematic showing of Figure 2, parts corresponding generally in construction and functioning to parts shown in Figure 1 are provided with the same reference numerals with the addition of a double prime accent thereto. In that Figure 2, a transducer 160 has been added on the normally upstream side of pipe line 10" to sense variations in the suction pressure just as transducer 12" senses variations in the discharge pressure on the downstream side of valve 11". If desired, additional transducers may be employed, such as one to sense a rate of flow change with the aid of a venturi section in pipe line 10", or by means of other transducers to sense changes in temperature, or other variables to be controlled. As shown, each of the transducers 12" and 160 send out a stimulus signal respectively over the lines 14" and 160a, to independent indicator-controller assemblies 15"a—16"a, on the one hand, and 15"b—16"b, on the other hand. The automatic controllers 15"a and 15"b are each electrically connected to a conventional adaptor 161 which selects the highest signal if an "over- riding" type of adaptor, or the lowest signal if an "underriding" type of adaptor.

In the schematic illustration shown in Figure 2, if too low a suction pressure is the greater foreseeable problem at that pipe line station, then an underride type of adaptor 161 would be selected to act in response to the lower value stimulus it receives such as might be provided by too low a suction pressure resulting in an operative imbalance beyond the "dead band" of a control circuit such as that shown in Figure 8. On the other hand, if the discharge pressure signal should move to too low a value because of a leak or break in the line on the discharge side of valve 11" and become the lower of the signals, then adaptor 161 would select that signal to send to the electronic valve control 20". A manual controller 17" may be interposed between adaptor 161 and valve control 20" and when the system is set to operate manually, the automatic controllers 15"a and 15"b and the adaptor 161 would be cut out of service leaving a person free to manually operate the controlled valve to a satisfaction position in accordance with that person's judgment.

Various changes may be made in components and features of illustrated embodiments of this invention and further embodiments may be provided without departing from the spirit of our invention or the scope of the appended claims.

We claim:

1. In an electronic valve control, apparatus comprising, in combination, a rotatable member to move a stem of a valve, a reversible electric motor connected to said rotatable member to rotate the same in a selected direction to a predetermined extent, a motor plugging switch connected to said motor, a motor director having a comparator subcircuit, a feed-back potentiometer mechanically connected to said motor to provide a response signal in accordance with movements of said motor, means for receiving a control signal in response to a stimulus from a variable to be controlled by said valve, said comparator subcircuit having means continuously to receive and oppose said signals, a sensitivity control to select a proportion of the differential between said respective signals, a polarized relay selectively operated by said differential proportion in response to the polarity of the potential of such differential, an anticipation subcircuit to electrically intensify the balancing movement effort of said potentiometer, the magnitude of such intensification being equivalent timewise to the electrical and mechanical lag in said electronic valve control, and a motor contactor responsive to actuate said motor in a selected direction corresponding to the actuation direction of said polarized relay.

2. In an electronic valve control, apparatus comprising, in combination, a rotatable member to move a valve, a reversible motor connected to said rotatable member to rotate the same in a selected direction to a predetermined extent, a motor plugging device connected to said motor, a motor director having a comparator subcircuit, a feed-back potentiometer mechanically connected to said motor to provide a response signal in accordance with movements of said motor, means for receiving a controller signal in response to a stimulus from a variable to be controlled by movement of said valve, said comparator subcircuit having means to receive and oppose said controller signal relative to the signal from said potentiometer to provide a directional differential, a polarized relay selectively operated by said differential in the direction of the polarity thereof, an anticipation subcircuit to electrically intensify the balancing movement effort of said potentiometer, and a motor contactor responsive to actuate said motor in a selected direction corresponding to the actuation direction of said polarized relay.

3. In an electronic control, apparatus comprising, in combination, a member to move a response device, a reversible motor connected to said member to move the same in a selected direction to a predetermined extent, a motor director having a comparator subcircuit, a potentiometer mechanically connected to said response device to provide a response signal in accordance with movements thereof, means for receiving a controller signal in response to a stimulus from a variable to be controlled by said response device, said comparator subcircuit having means to compare said signals and provide an output based on the difference between said signals, a relay selectively operable by said differential, an anticipation subcircuit to electrically intensify the balancing movement responding output of said potentiometer to deenergize said motor in advance of a positional balance by said potentiometer, a motor contactor responsive to the selective operation of said relay, and means to stop said motor substantially upon achievement of an actual positional balance by said potentiometer.

4. In an electronic valve control for a valve to be moved to satisfy a controllable variable stimulus, apparatus comprising, in combination, a manual preference non-coincidental clutch mechanism having a slidable clutch member selectively operably connectible to motor and manual driving sources, a reversible electric motor connected to said clutch mechanism to serve as said motor driving source, an electrical zero speed plugging switch mechanically connected to the rotor of said motor, a feed-back circuit having a movable contact therein mechanically connected to said valve for movement therewith in response to movements of the selected one of said driving sources, a motor director circuit, a selective direction motor energization circuit interconnected therewith, said motor energization circuit also being interconnected with said plugging switch, said motor director circuit having a resistance therein to vary the output value of the response signal from said potentiometer for respective directions of movement of said driving sources, a comparator subcircuit in said motor director circuit to receive and buck a control signal originating with a change in said variable and a response signal from said feed-back circuit to energize said motor energization circuit and operate said motor driving source in a direction to change the magnitude of said response signal in the direction of the magnitude of said control signal, an anticipation subcircuit in said motor director circuit having respective shuntable resistance therein to provide an electrical null balance between said signal magnitudes a preselected time in advance of the physical satisfaction of said variable by movement of said valve, and a sensitivity control in said motor director circuit to provide a dead-band on each side of said electrical null balance point to inhibit hunting and actuation by signals of less than a predetermined magnitude.

5. In an electronic valve control for a valve to be moved to satisfy a controllable variable stimulus, apparatus comprising, in combination, a valve mechanism having a reversible motor driving source, a feed-back circuit connected to said valve to provide a response in accordance with movements of said motor, a motor energization circuit for said motor, a comparator subcircuit to receive and compare a control signal originating with a change in said variable with a response signal from said feed-back circuit to energize said motor energization circuit and operate said motor in a signal balance direction of said response signal in the direction of the magnitude of said control signal, and means to provide such signal balance and deenergize said motor a predetermined time in advance of the physical satisfaction of said variable by said valve equal to the stoppage lag time of said valve.

6. In an electronic valve control, apparatus comprising, in combination, a rotatable member to move a stem of a valve, a reversible electric motor connected to said rotatable member to rotate the same in a selected direction to a predetermined extent, a plugging device connected to said motor, a feed-back potentiometer mechanically connected to said motor to provide a response signal in accordance with movements of said motor, a comparator subcircuit to receive a control signal in response to a stimulus from a variable to be controlled by said valve and continuously compare said signals, a sensitivity control to select a proportion of the differential between said respective signals, a relay selectively operated by said differential proportion in response to the polarity of the potential of such differential, and a motor contactor responsive to actuate said motor in a selected direction corresponding to the actuation direction of said relay.

7. In an electronic system for controlling a valve or the like, the steps comprising, in combination, feeding a positive direct current voltage control signal based on a stimulus to an electronic comparator, moving a feed-back potentiometer member in response to movements of said valve, feeding a negative direct current voltage valve positional response output from said potentiometer to said comparator, continuously comparing the magnitudes of said control signal and response output, feeding a proportion of the differential therebetween to a selective direction motor actuator, and anticipating the time of the physical satisfaction provided in the new rest position of said valve by advancing the comparison balance achieved by said comparator.

8. In an electronic system for controlling a valve or the like, the steps comprising, in combination, receiving a stimulus from a controllable variable, providing an electrical control signal corresponding to said stimulus, feeding said control signal to an electronic comparator, feeding an electrical signal corresponding to the position of said valve to said comparator to measure any differential between said signals, feeding at least a proportion of such differential to a motor actuator through a selected side of a twin circuit for respective opening and closing of said valve, continuing the comparison of said signals as such signals change in accordance with respective changes in said stimulus and the position of said valve, and anticipating the time of the physical satisfaction to be provided by said valve by electrically advancing the balance between said signals by a preselected length of time.

9. In an electronic system for controlling a valve or the like, the steps comprising, in combination, receiving a plurality of stimuli from a plurality of controllable variables, selecting one of said stimuli to provide a corresponding control signal, feeding said control signal to an electronic comparator, feeding a signal corresponding to the position of said valve to said comparator to measure any differential between said signals, feeding at least a proportion of such differential to a motor actuator through a selected side of a twin circuit for respective opening and closing of said valve, continuing the comparison of said signals as such signals change in accordance with respective changes in said selected stimulus and the position of said valve, and anticipating the time of the physical satisfaction to be provided by said valve by electrically advancing the time of the balance between said signals.

10. In an electronic control system to move a response device to satisfy the stimulus of a controllable variable, the steps comprising, in combination, feeding an electrical control signal based on said stimulus to an electric comparator, measuring the movements of said response device, feeding a response signal corresponding to said movements to said comparator to yield any differential between said signals, feeding at least a proportion of any such differential to an actuator for said response device, and electrically balancing said signals a preselected time in advance of the achievement of a physical satisfaction position by said response device equal to the stoppage lag time of said response device.

References Cited in the file of this patent

UNITED STATES PATENTS

| | | |
|---|---|---|
| 2,015,967 | Ryder | Oct. 1, 1935 |
| 2,534,801 | Siltamaki | Dec. 19, 1950 |

UNITED STATES PATENT OFFICE
CERTIFICATE OF CORRECTION

Patent No. 2,961,586 November 22, 1960

James N. Morrell et al.

It is hereby certified that error appears in the above numbered patent requiring correction and that the said Letters Patent should read as corrected below.

In the grant, line 2, for "Hume" read -- Hune --.

Signed and sealed this 29th day of August 1961.

(SEAL)
Attest:

ERNEST W. SWIDER
Attesting Officer

DAVID L. LADD
Commissioner of Patents
USCOMM-DC